United States Patent [19]
Piper

[11] 3,861,732
[45] Jan. 21, 1975

[54] ADJUSTABLE GRIPPER APPARATUS
[75] Inventor: John Charles Piper, Bethel Park, Pa.
[73] Assignee: Combustion Engineering, Inc., Windsor, Conn.
[22] Filed: Jan. 11, 1974
[21] Appl. No.: 432,705

[52] U.S. Cl. ................ 294/65, 294/67 R, 294/67 E
[51] Int. Cl. ............................................ B66c 1/02
[58] Field of Search ...... 294/65, 67 R, 67 B, 67 BB, 294/67 DA, 67 E, 67 EA, 74, 81 R

[56] References Cited
UNITED STATES PATENTS
3,610,673 10/1971 Strombeck et al. ............... 294/81 R
3,727,965 4/1973 Cranston et al. .................... 294/67 R Primary Examiner—Evon C. Blunk
Assistant Examiner—Jeffrey V. Nase
Attorney, Agent, or Firm—John R. Nelson

[57] ABSTRACT

An adjustable gripping apparatus having two pairs of grippers. Each of the grippers of the first pair is slidably mounted for sliding movement along a laterally extending guide means. Each of the grippers of the second pair is mounted on an associated one of a pair of oppositely spaced gripper positioning members. The gripper positioning members are each rotatably supported to rotate about a pivot axis extending perpendicular to the lateral direction of the guide means. A pair of articulating linkage assemblies are provided, each of which is pin connected at one end to one of the first pair of grippers and fixedly connected at the other end to an associated one of the gripper positioning members. The joint of each articulating linkage assembly is offset from the pivot axis of its associated gripper positioning member so that rotation of the gripper positioning member causes sliding movement of the associated gripper of the first pair to change the gripping position thereof.

8 Claims, 7 Drawing Figures

ADJUSTABLE GRIPPER APPARATUS

BACKGROUND OF THE INVENTION

This invention relates to an adjusting gripping apparatus having adjustable gripping positions.

Devices for gripping or engaging objects to permit lifting and placement thereof are well known. Generally, such devices are used when objects cannot be easily moved but must instead be lifted and transported by machines such as cranes. Gripping or engaging devices usually serve to provide a rigid engagement with the object or to provide a means by which the lifting or transporting mechanism may be coupled to the object.

As can be appreciated, it is desirable that the gripping device be flexible in its operation so that it may perform more than one particular gripping task. For example it is preferable that the gripping device be adaptable to engage a variety of sizes of objects. Also, it is desirable that the device be adjustable so as to engage objects having different permissible locations of attachments. Furthermore, ease of adjustment is desirable to minimize the time and effort required in adjusting the device to perform a different gripping task.

SUMMARY OF THE INVENTION

Accordingly, the present invention contemplates a novel gripping apparatus having the above-noted desirable features. The gripping apparatus has a first pair of grippers supported for lateral sliding movement along a laterally extending guide means. The second pair of grippers is mounted on associated gripper positioning members. The gripper positioning members are oppositely spaced and are each rotatably supported to rotate about an axis extending perpendicular to the lateral direction of the guide means. A pair of articulating linkage assemblies are provided, each of which has a joint and each of which is pin connected at one end to one of the first pair of grippers and is fixedly connected at the other end to one of the gripper positioning members. The joint of the articulating linkage assembly is offset from the pivot axis of its associated gripper positioning member so that rotation of the gripper positioning member causes the gripper of the first page to slide along the guide means thereby changing the gripping position thereof.

In the preferred embodiment, the gripping apparatus is coupled to an object by means of a vacuum applied at the interface of the gripper and the object. This preferred form of the present invention is particularly useful to permit lifting and transporting of extruded plastic refractory blocks such as are described in copending application Ser. Nos. 410,575 and 410,576, both filed Oct. 29, 1973 by S. C. Porter and G. V. Prible and entitled, respectively, "Method of Forming Reinforced Plastic Refractory Blocks and of Using Same" and "Extruded Refractory Blocks with Integral Anchors." The extruded refractory blocks disclosed in these applications have extruded grooves or channels on the surface thereof into which ceramic reinforcing means are fitted. The gripping apparatus permits adjustment of the gripping positions so that the vacuum will only be applied to the ungrooved portion of the block surface. This allows the gripping apparatus to remain coupled to the block while it is lifted and transported by a crane.

DESCRIPTION OF THE PREFERRED EMBODIMENT

Figure 1:
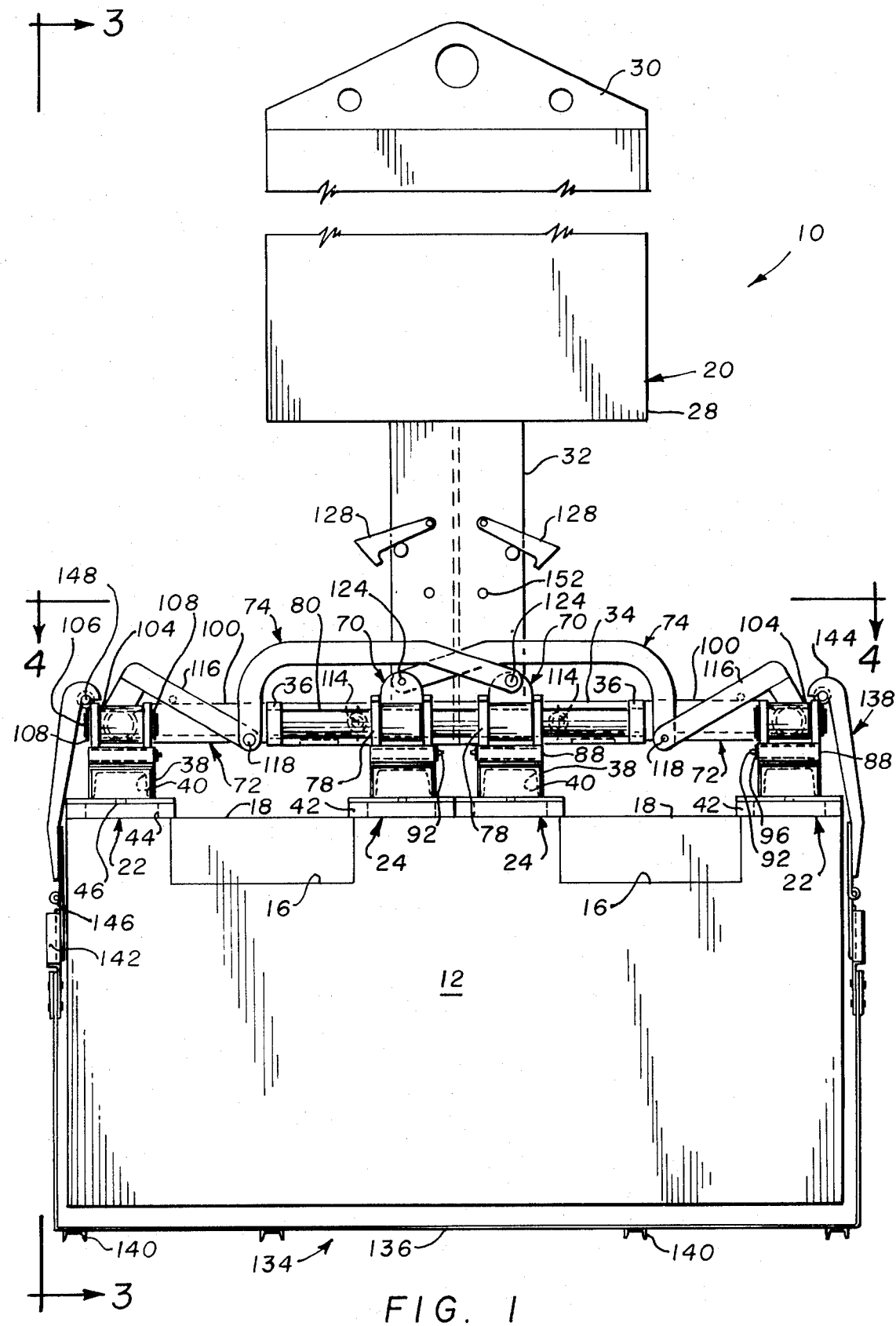
FIG. 1 is a front elevation of the gripping apparatus of the present invention showing one gripping position of the grippers by which a full plastic refractory block may be gripped by the apparatus.

The preferred embodiment of the present invention is directed to a gripping apparatus 10 adapted to be coupled or attached to plastic refractory blocks 12, 14 such as are described in the above-noted copending application, Ser. Nos. 410,575 and 410,576. These blocks 12, 14 are adapted for placement as the refractory lining of heating chambers such as soaking pits or reheat furnaces in the steel industry. The gripping apparatus 10 permits the blocks 12, 14 to be coupled to a crane (not shown) which can then lift, transport and place the blocks 12, 14 in the heating chamber to form the lining thereof. Of course, it is to be understood that the present invention is not limited to use only with plastic refractory blocks, but is equally applicable for use in other areas wherein it is necessary or desirable to provide means having adjustable gripping positions for rigidly engaging objects.

The plastic refractory blocks 12, 14, as described in the copending applications, comprise extruded lengths of plastic refractory material which have at least one channel or groove 16 extruded in the upper surface thereof into which ceramic anchoring or reinforcing means 18 are placed. The two basic groups or types of blocks shown are full blocks 12 which have two channels 16 extruded therein and half blocks 14 which have only one channel 16 extruded therein. The half blocks 14 are generally formed by splitting full blocks 12 along the extruded length thereof. These blocks 12, 14, vary in size both in cross section and extruded lengths thereof and also vary with respect to the permissible locations of gripping engagement or coupling with the gripping apparatus 10.

Figure 2:
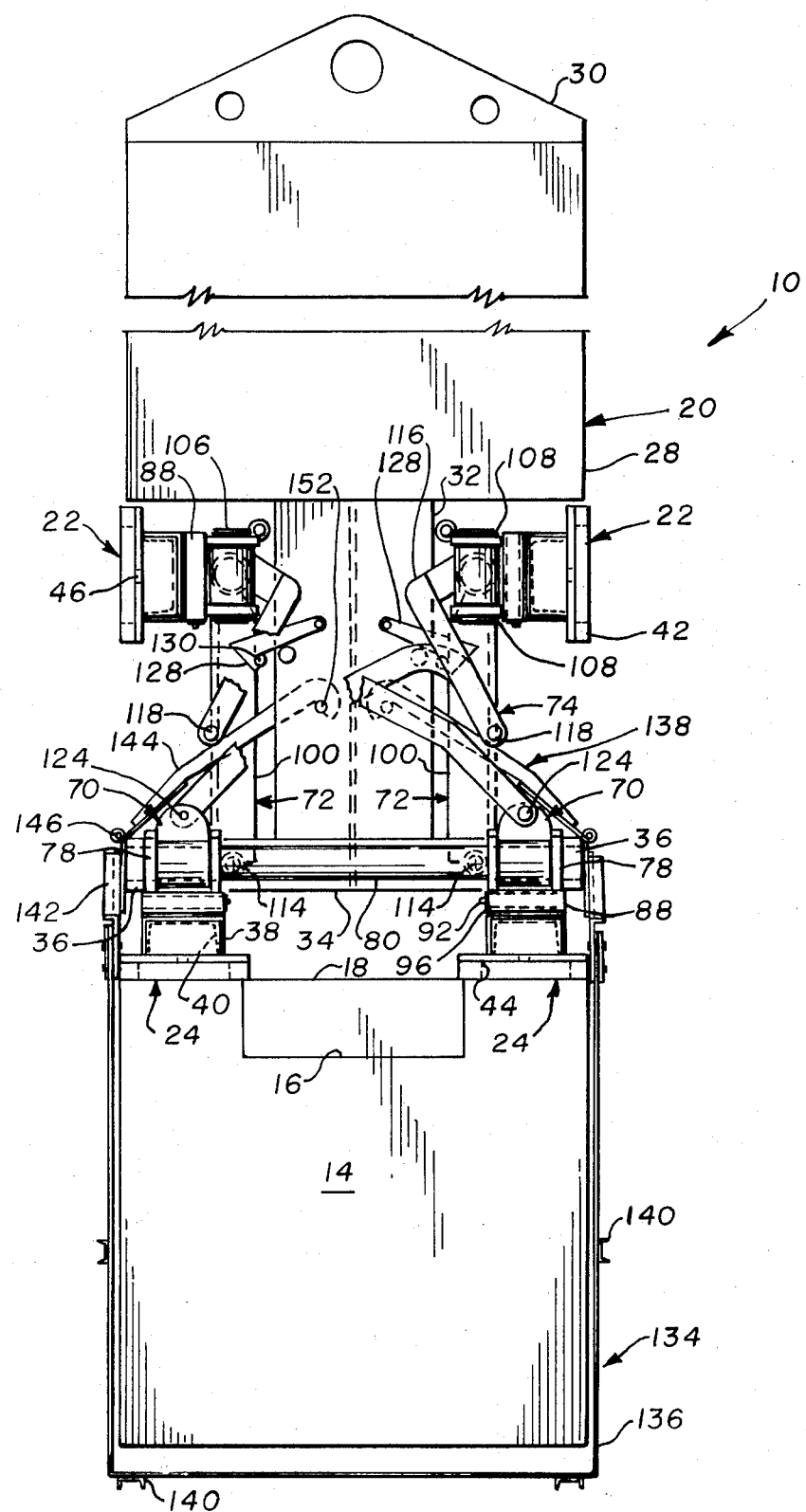
FIG. 2 is a front elevation of the gripping apparatus similar to that of FIG. 1 but with portions thereof cut away for clarity and showing a second gripping position of the grippers by which a half block may be gripped.
Figure 3:
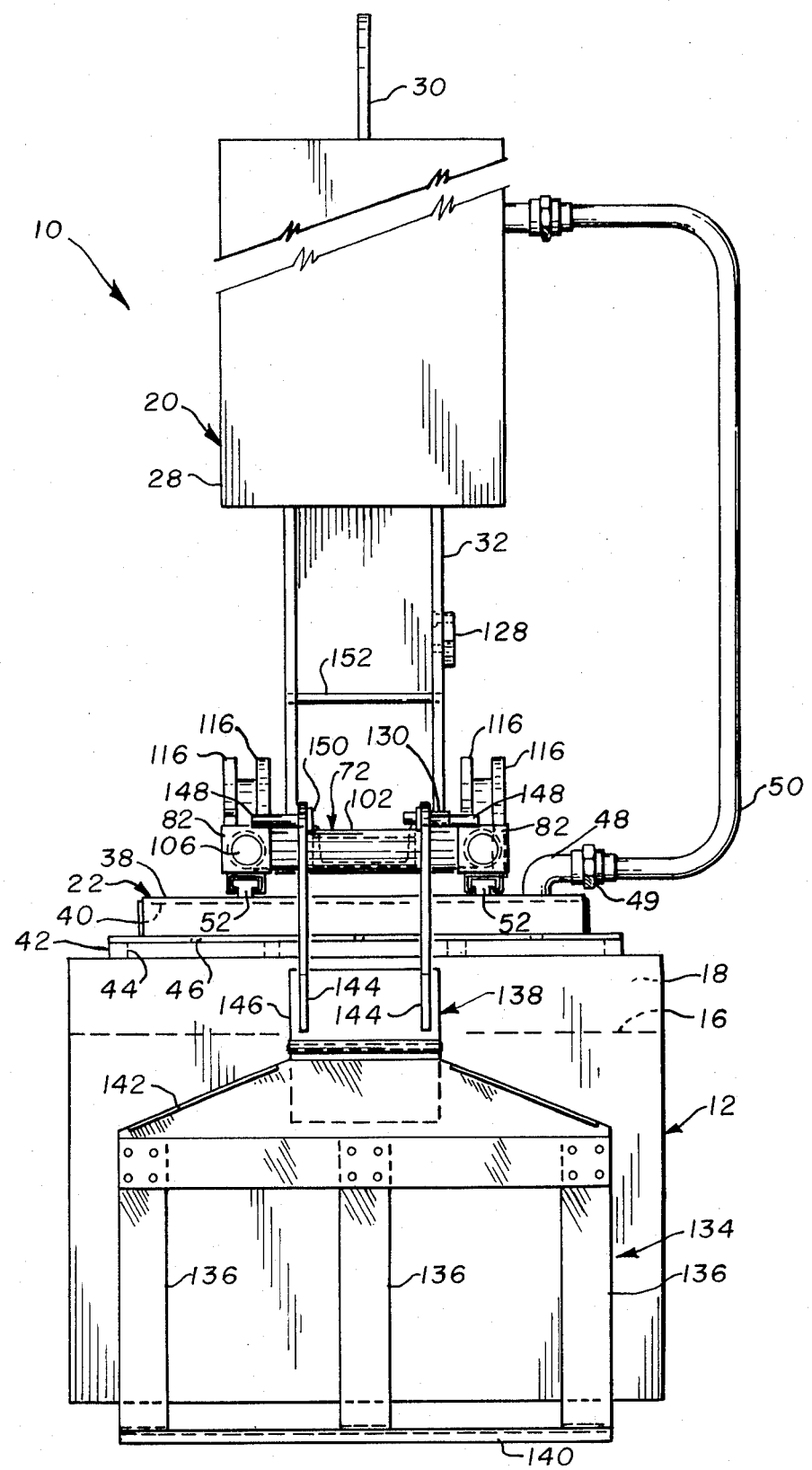
FIG. 3 is a side elevation of the gripping apparatus taken along line 3—3 of FIG. 1.

The preferred embodiment of the gripping apparatus 10 for the present invention, as seen in FIGS. 1, 2 and 3, is adaptable to engage or be coupled with the plastic refractory blocks 12, 14 of both groups or types. The gripping apparatus 10 comprises a frame assembly 20, four grippers 22, 24, and a mechanism for supporting the grippers 22, 24 and adjusting the gripping positions thereof. In this embodiment the griping apparatus 10 is coupled to the blocks 12, 14 by means of a vacuum or suction applied through the grippers 22, 24. However, this is not meant to be limiting as other types of grippers could be utilized depending on the type of object to be engaged and the requirements in lifting thereof.

Referring to FIGS. 1-3, the frame assembly 20 includes a housing 28 in which a conventional vacuum pump and controls (not shown) are housed. A lifting plate 30 is fixedly attached to the upper end of the housing 28. A crane or other transporting mechanism (not shown) is adapted to engage the lifting plate 30 to lift and/or transport the gripping apparatus 10 and plastic refractory block 12, 14 coupled thereto. A longitudinally extending structural member or I-beam 32 is fixed to the bottom of the housing 28. Two spaced, laterally extending support bars 34 are fixedly attached to the lower end of the I-beam 32 for supporting the grippers 22, 24 and gripping adjusting mechanism as described hereinbelow.

Each of the four grippers 22, 24 of the gripping apparatus 10 is a vacuum gripper assembly which is adapted to mate with the surface of the blocks 12, 14 and through which a vacuum or suction may be applied to couple the vacuum gripper assembly 22, 24 to the blocks 12, 14. The vacuum gripper assemblies 22, 24 each comprise a neoprene foam pad 42 and a manifold 38 having an interior chamber 40 (see FIGS. 3, 5, 6). The foam pad 42 has a plurality of sections cut out thereof to form cells 44 and is cemented to the bottom plate of the manifold 38. Holes 46 (see FIGS. 3, 5, 6) in the bottom plate provide communication between each cell 44 of the pad 42 and the interior chamber 40 of the manifold 38. An elbow 48 (see FIG. 3) is affixed to the upper surface of the manifold 38 to communicate with the interior chamber 40. The elbow 48 is adapted to be coupled by a quick disconnect 49 to an appropriate flexible vacuum conduit 50 (see FIG. 3) which communicates with the vacuum pump in the housing 28 to apply a vacuum or suction in the interior chamber 40 of the manifold 38 and, accordingly, to the lower surface of the pad 42. The use of a plurality of cells 44 and holes 46 protects against failure of the vacuum gripper assemblies 22, 24 should the vacuum be lost in a given cell 44 through cracks developing in the refractory block. The vacuum loss in the cell 44 would be controlled by the size of the hole 46 communicating therewith.

The plastic refractory blocks 12, 14 can vary in extruded lengths from about 12 inches to 14 inches and in weight from 1,000 lbs. to 4,000 lbs. As can be appreciated, the lengths of a vacuum gripper assembly 22, 24 must be less than, but should still closely correspond to, the extruded lengths of the plastic refractory blocks 12, 14 to provide a sufficient coupling force therebetween. Accordingly, it is preferable that several sets of vacuum gripper assemblies 22, 24 of different lengths be provided. Each of these different vacuum gripper assemblies would be similar to the vacuum assemblies 22, 24 shown with the exception that the length thereof and number of cells 44 would vary. The location of the elbow 48 in the supporting means (T-shaped bars 52 described hereinbelow) would remain the same relative to the center of each vacuum gripper assembly 22, 24.

Figure 4:
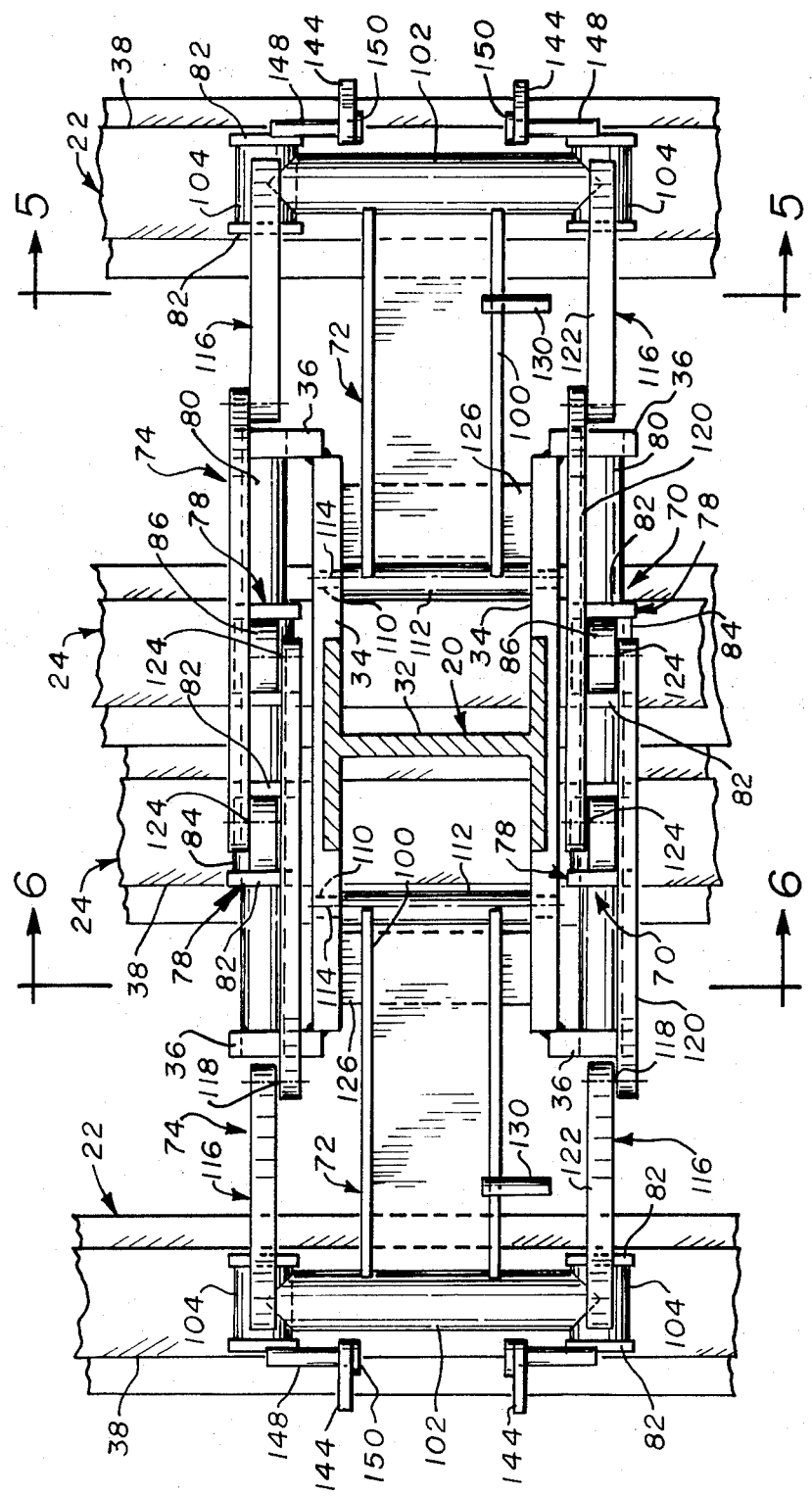
FIG. 4 is a sectional view of the gripping apparatus taken along line 4—4 of FIG. 1.
Figure 7:
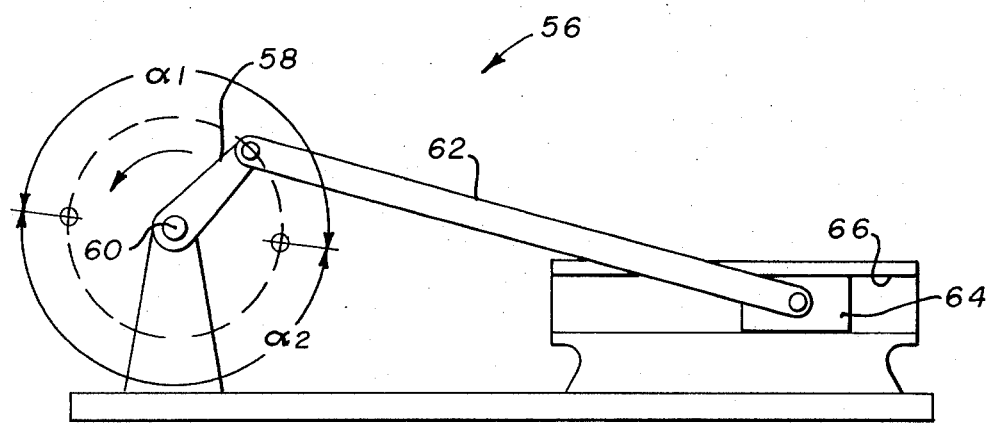
FIG. 7 is a simplified schematic diagram of an eccentric slider crank mechanism used in the present invention.

The adjusting mechanism of the present invention for supporting and adjusting the gripping position of the grippers 22, 24 comprises two oppositely oriented eccentric slider crank type mechanisms each of which supports two vacuum gripper assemblies 22, 24. A simplified schematic diagram of a typical eccentric slider crank 56 is shown in FIG. 7. As can be seen, rotation of the crank 58 about the pivot point 60 causes the connecting rod 62 to move the slider 64 back and forth in the slideway 66. The term "eccentric" refers to the fact that the axis of the slideway 66 is not at the same elevation as the pivot point 60 of the crank 58. The crank angles $\alpha_1$ and $\alpha_2$ represent the dead centers or furthest points reached by the slider 64. Referring now to FIGS. 1 and 4, each eccentric slider crank mechanism in the present invention comprises a slider assembly 70 for supporting an inner vacuum gripper assembly 24, a gripper positioning member 72 for supporting an outer vacuum gripper assembly 22, and articulating linkage assembly 74 which interconnects a slider assembly 70 and a gripper positioning member 72.

Figure 5:
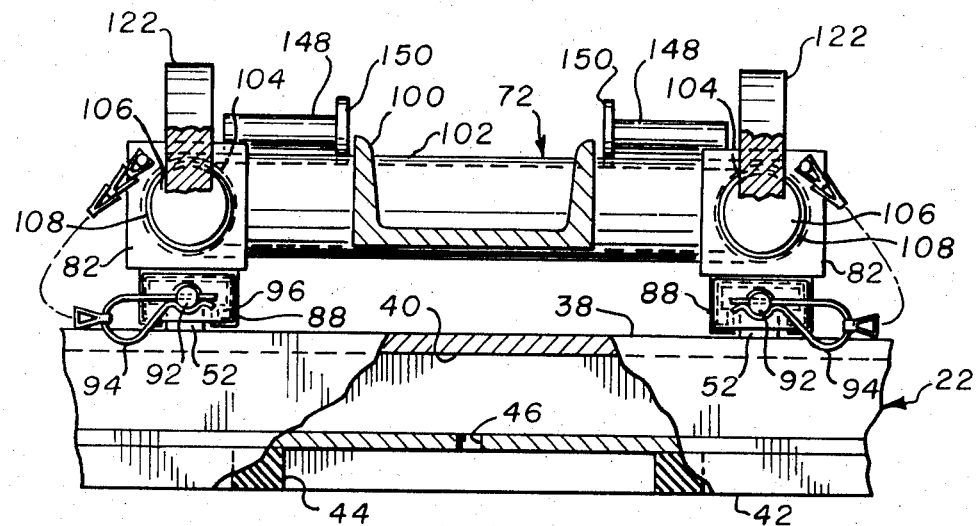
FIG. 5 is a side sectional view taken along line 5—5 of FIG. 4 showing a gripper mounted on a gripper positioning member, portions thereof being cut away for clarity.
Figure 6:
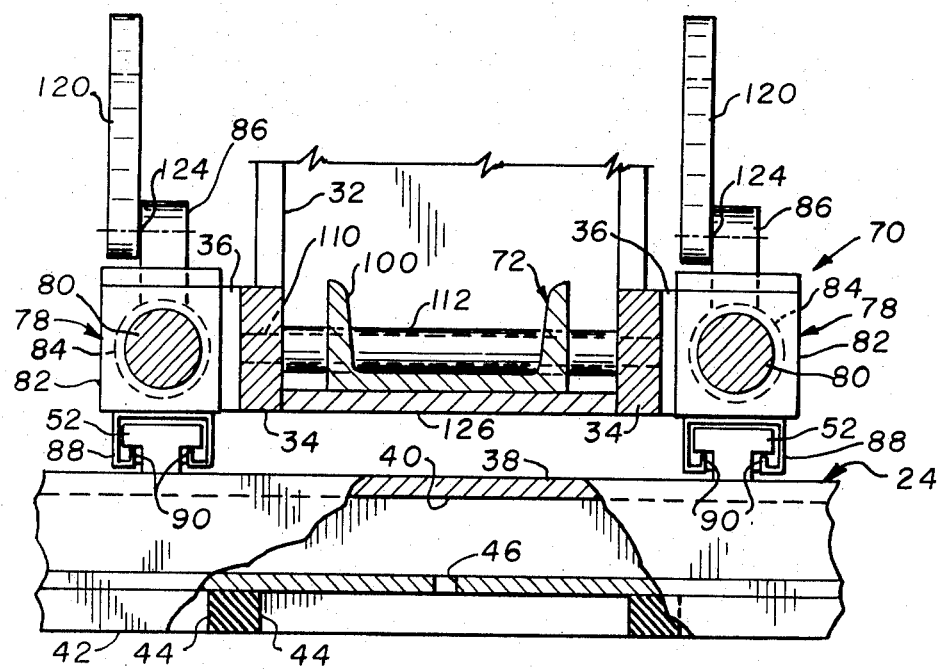
FIG. 6 is a side sectional view taken along line 6—6 of FIG. 4 showing a gripper mounted on a guide means, portions thereof being cut away for clarity.

Referring to FIGS. 4 and 6, each slider assembly 70 has two spaced, sliding supports 78 which are each slidably mounted on separate, oppositely spaced, laterally extending guides 80. The guides 80 in the preferred embodiment are rods fixedly mounted between spaced plates 36 fixed to the ends of the support bars 34 of the frame assembly 20. Each sliding support 78 comprises two spaced plates 82 and a short section of hollow pipe 84 therebetween through which passes one of the guide rods 80. A bar 86 is affixed to the upper surface of the pipe section 84 to which one end of the articulating linkage assembly 74 may be connected as described hereinbelow. The plates 82 are connected to and support an inverted channel 88 (FIGS. 1 and 6) having upturned edges or lips 90 at its lower end. Each vacuum gripper assembly 24 is provided with two spaced T-shaped bars 52 (see FIGS. 3 and 6) fixed to the upper surface thereof. The spacing between the two bars 52 is substantially equivalent to the spacing between the two bars 52 is substantially equivalent to the spacing between the two laterally extending guide rods 80. The two T-shaped bars 52 are adapted to fit into the inverted channel 88 of the sliding supports 78 of one slider assembly 70 and rest on the upturned lips 90. When the T-shaped bars 52 are positioned in the channels 88, a projection 92 (see FIG. 1; also see FIG. 5 which is representative) on each bar 52 protrudes through an opening in a plate 96 fixed to one end of each inverted channel 88. The bars 52 and accordingly the vacuum gripper assembly 24 are held thereinplace by hitch pins 94 (FIG. 5) which pass through the protruding projections 92 of the bars 52.

Referring to FIGS. 4 and 5, each of the gripper positioning members 72 comprises a U-shaped channel member 100 having a transversely oriented tubular support member 102 fixed at one end. The tubular support member 102 extends beyond the width of the channel member 100 and fixedly supports a short section of pipe 104 at each end. The spacing between the two sections of pipe 104 is substantially equal to the spacing between the two guide rods 80. Two spaced plates 82 interconnected by an inverted channel member 88 and similar to those of the sliding supports 78 (see also FIG. 6) are supported from each section of pipe 104 by a rod 106 passing through the pipe 104 and the two plates 82. The rod 106 is held thereinplace by retaining rings 108 on each end (see FIG. 1). As with the slider assembly 70 a vacuum gripper assembly 22 is supported from the tubular support member 102 by T-shaped bars 52 which rest on the upturned lips 90 of the inverted channels 88.

Referring to FIGS. 1, 2, and 4, the two gripper positioning members 72 are oppositely oriented and positioned on opposite sides of the I-beam 32 between the two spaced support bars 34 of the frame assembly 20. Each gripper positioning member 72 is pivotally mounted thereat by means of a rod 110 which passes through a second tubular member 112 fixed to each channel member 100 at the opposite end from the first tubular member 102. The ends of the rods 110 are fixed to the two support bars 34 and each gripper positioning member pivots above the axis 114 of the associated rod 110.

Still referring to FIGS. 1, 2, and 4, each slider assembly 70 is interconnected to an associated one of the gripper positioning members 72 by means of an articulating linkage assembly 74. In the preferred embodiment each articulating linkage assembly 74 comprises a pair of spaced two-arm linkages 116, each of which has a pivotable joint 118. Each two-arm linkage 116 is pin connected at one end to the bar 86 of one sliding support 78 of the slider assembly 70 and is fixedly connected at the other end to one of the pipe sections 104 of the associated gripper positioning members 72. It should be noted that the location of the pivotable joint 118 of each two-arm linkage 116 is fixed with respect to the gripper positioning member 72 since the second arm 122 (FIG. 5) of each linkage 116 is fixedly connected thereto. Also, as best seen in FIG. 1, the pivotable joint 118 of each two-arm linkage 116 is laterally offset from the pivot axis 114 of the associated gripper positioning member 72. This is necessary to ensure sliding movement of the slider assembly 70 as will be apparent hereinbelow. Furthermore, as is typical of eccentric slider crank mechanisms, the pivotal connection 124 between the two-arm linkage 116 and the sliding support 78 is vertically offset from the pivot axis 114 of the associated gripper positioning member 72.

Before operation of the gripping apparatus 10 is described, it should be noted that suction should only be applied to the ungrooved portions of the surface of plastic refractory blocks 12, 14. Although the ceramic reinforcing means 18 is tight fitting in the grooves 16, it is not able to support the weight of the blocks 12, 14. Accordingly, if the ceramic reinforcing means 18 was subject to the suction applied through the vacuum gripper assemblies 22, 24, the reinforcing means 18 may disengage from the groove 16 and the blocks 12, 14 would fall.

As can be seen in FIG. 1, the four vacuum gripper assemblies 22, 24 are all substantially at the same elevation and are spaced laterally to mate with the ungrooved portion of a full plastic refractory block 12. More specifically, the two outer vacuum gripper assemblies 22, attached to the two gripper positioning members 72, mate the outer ungrooved portions on the block 12 while the two inner vacuum gripper assemblies 24, which are in abutting relationship, engage the central ungrooved portion. In this lowered gripping position, the U-shaped channel member 100 of each gripper positioning member 72 rests on a plate 126 extending between the two spaced bars 34 of the frame assembly 20. The plates 126 prevent downward rotational movement of the gripper positioning members 72 and ensure that the two outer vacuum gripper assemblies 22 will be at the same elevation as the two inner vacuum gripper assemblies 24. With the vacuum gripper assemblies 22, 24 in the lowered position, the gripping apparatus 10 may be positioned to mate with a full block 12 and a vacuum or suction applied thereto to couple the vacuum gripper assemblies 22, 24 thereto. A crane or other appropriate transporting mechanism, may then engage the lifting plate 30 of the housing 28 and transport the gripping apparatus 10 and block 12 coupled thereto to a heating chamber as described in the previously noted copending application Ser. Nos. 410,575 and 410,576.

FIG. 2 shows the second gripping position in the gripping apparatus 10 which permits mating engagement with the ungrooved portions of a half plastic refractory block 14. The half block 14 has only one central groove 16 with an appropriate reinforcing means 18 positioned therein. Only the two inner vacuum gripper assemblies 24 are used for coupling so that there will be substantial alignment of the centers of gravity of the gripping apparatus 10 and the half block 14. To position the vacuum gripper assemblies 24 in the second gripper gripping position, it is only necessary to shut off the supply of vacuum to the two outer vacuum gripper assemblies 22 such as by valves (not shown) in flexible conduits 50 and then rotate each gripper positioning member 72 upwards. This causes the two inner vacuum gripper assemblies 24 to slide laterally apart along the guide rods 80. That is, referring to FIGS. 1 and 2, as the right gripper positioning member 72 is rotated upwards (i.e., counterclockwise) the left slider assembly 70 is forced to slide to the left along the guide rods 80, and as the left gripper positioning member 72 is rotated upwards (i.e., clockwise) the right slider assembly 70 is forced to slide to the right. The two gripper positioning members 72 are held in the raised position by hooks 128 mounted on the I-beam 32 of the frame assembly 20. The hooks 128 each engage a pin 130 (FIGS. 3 and 4) affixed to each U-shaped channel 100 at an appropriate location.

The specific design of the two-arm linkages 116 is mainly dependent on the desired amount of sliding movement of a slider assembly 70 as the gripper positioning member 72 is rotated upwards. But consideration should also be given to the ease with which the device may be assembled, and to providing free, uninhibited rotation and sliding movement of the gripper positioning members 72 and the slider assemblies 70 respectively. Referring to FIGS. 1 and 7, a comparison may be made of the similarity between the adjusting mechanism of the gripping apparatus 10 and a typical eccentric slider crank mechanism. First, it is noted that the gripper positioning member 72 and the arm 122 (FIG. 4) of the two-arm linkage 116 fixed thereto correspond to the crank 58 in FIG. 7. Secondly, the other arm 120 of the two-arm linkage 116 and the sliding support 78 correspond to the connecting arm 62 and slider 64 respectively of FIG. 7. Accordingly, a determination may be easily made, using the schematic diagram of FIG. 7, of the precise location of the pivotable joint 118 of a two-arm linkage 116 so as to achieve the desired amount of sliding movement of a slider assembly 70. Then the specific shape and size of the two-arm linkage 116 may be determined to provide ease of assembly and to ensure no interference between components during operation of the device.

As an added safety feature, the gripping apparatus 10 of the preferred embodiment is also provided with a sling assembly 134 which is adapted to prevent falling of a plastic refractory block 12, 14 if the vacuum or suction coupling fails. Referring to FIGS. 1–3, each sling assembly 134 comprises a plurality of spaced nylon webbing straps 136 and two connecting means 138 for connecting the sling assembly 134 to the gripping apparatus 10. The nylon straps 136 are parallelly spaced and are interconnected along the length by a plurality of transversely extending channels 140. The spacing of the nylon straps 136 should be such that the overall width of the sling assembly 134 is slightly less than the extruded length of the plastic refractory blocks 12, 14. Of course, the number of nylon webbing straps 136 to be provided will depend on the weight of the plastic refractory block 12, 14 or other object which is to be supported if the vacuum or suction fails. As to the spacing and number of transversely extending channels 140, in the preferred embodiment four channels 140 are provided and the spacing between the two central channels 140 is slightly less than the width of a half block 14 while the spacing between the two outer channels 140 is slightly less than the width of a full block 12 (see FIGS. 1 and 2). As best seen in FIGS. 1 and 3, the ends of the straps 136 are fixedly connected to end plates 142. The connecting means 138 each include two spaced hooks 144 affixed to one plate of a hinge 146. The other plate of each hinge 146 is fixedly connected, such as by welding or riveting, to one of the end plates 142 connected to the nylon straps 136. It should be noted that a plurality of these sling assemblies 136 of different overall widths is desirable if the gripping apparatus 10 is to accommodate different lengths of extruded plastic refractory blocks 12, 14.

Each sling assembly 134 may be used for both full blocks 12 and half blocks 14. For use when the gripping apparatus 10 is coupled to a full block 12 the sling assembly 134 is supported from the ends of the gripper positioning members 72. As best seen in FIG. 3, rods 148 having discs 150 affixed to one end are fixedly supported from the outer plate of the two spaced plates 82 which support an outer vacuum gripper assembly 22. The hooks 144 of each end of the sling assembly 134 are placed over the rods 148 adjacent to the discs 150. In this position, the nylon straps 136 of the sling assembly 134 pass freely around the lower end of the full block 12. If the block should become uncoupled from the vacuum gripper assemblies 22, 24, it will fall only a short distance into the sling assembly 134. For use when the gripping apparatus 10 is coupled to a half block 14, the hooks 144 are removed from the rods 148 at the ends of the gripper positioning members 72 and instead are placed over rods 152 which extend between the flanges of the I-beam 32 of the frame assembly 20. (See FIGS. 2 and 3.) The location of these rods 152 is such that the sling assembly 134 will be closely spaced around the half block 14 when such a block 14 is coupled to the gripping apparatus 10.

As hereinabove noted, the preferred embodiment of a gripping apparatus 10 has been shown and described with reference to plastic refractory blocks 12, 14. However, this is not meant to be limiting on the use of the gripping apparatus of the present invention. The gripping apparatus 10 is equally applicable for employment in other areas wherein it is desirable and/or necessary to use adjustable gripping means to provide a rigid temporary engagement with an object. It should also be noted that the gripping apparatus 10 is not limited to use with a vacuum or suction. For example, electromagnetic grippers as opposed to vacuum grippers 22, 24 could be used to engage a magnetic object.

It will be understood that the embodiment shown and described herein is merely illustrative and that changes may be made without departing from the scope of the invention. What is sought to be protected herein only is that which is recited in the appended claims.

What is claimed is:

1. A gripping apparatus having adjustable gripping positions comprising:

a frame assembly;

a first and second pair of grippers for gripping objects;

laterally extending guide means supported from said frame assembly;

means for mounting said first pair of grippers on said guide means for lateral sliding movement therealong;

a pair of oppositely spaced gripper positioning members;

means for each of said gripper positioning members for pivotably mounting said gripper positioning members to said frame assembly to rotate about independent pivot axes extending perpendicular to said lateral direction of said guide means;

gripper mounting means for each of said grippers of said second pair for mounting each of said grippers on one of said gripper positioning members at a location remote from its pivot axis;

a pair of articulating linkage assemblies each of which has at least one joint;

means for pivotally connecting one end of each articulating linkage assembly to one of said grippers of said first pair and means for fixedly connecting the other end of each articulating linkage assembly to one of said gripper positioning members;

said joint of each of said articulating linkage assemblies being offset from said pivot axis of its associated gripper positioning member whereby rotation of one of said gripper positioning members causes said gripper of said first pair associated therewith to slide along said guide means to change the gripping position thereof.

2. The apparatus of claim 1 in wherein said means for mounting said first pair of grippers and said means for pivotally connecting one end of each of said articulating linkage assemblies comprises a pair of slider assemblies each of which is slidably mounted on said guide means to slide laterally therealong, each of said grippers of said first pair being removably supported from one of said slider assemblies and each of said articulating linkage assemblies being pivotally connected at one end to one of said slider assemblies.

3. The apparatus of claim 2 wherein said means for fixedly connecting said other end of each of said articulating linkage assemblies is said gripper mounting means for each of said grippers of said second pair, each of said grippers of second pair being removably supported from one of said mounting means and each of said linkage assemblies being fixedly connected at said other end to one of said mounting means.

4. The apparatus of claim 3 wherein said guide means comprises a pair of spaced parallel laterally extending rods supported on said frame assembly; wherein each of said slider assemblies comprises two sliding supports each of which is adapted to slide along one of said guide rods; and wherein each of said articulating linkage assemblies comprises a pair of parallel spaced two-arm linkages each of which has a pivotal joint, each of said two-arm linkages of one of said articulating linkage assemblies being pivotally connected at one end to one of said two sliding supports of one of said slider assemblies and being fixedly connected at the other end to said gripper mounting means of said gripper positioning members.

5. The apparatus of claim 4 further including a safety sling assembly for supporting the object if said grippers should fail, said sling assembly being connected to and supported from said gripper positioning members when said grippers are in one position and being connected to and supported from said frame assembly when said grippers are in another gripping position.

6. The apparatus of claim 5 wherein each of said grippers is a vacuum gripper assembly having a mating surface adapted to mate with the surface of an object;

a vacuum pump mounted on said frame assembly for providing a vacuum source; and conduit means coupled to said vacuum pump and at least one of said vacuum gripper assemblies for communicating a vacuum to the mating surface of said vacuum gripper assembly to grip the object.

7. The apparatus of claim 3 wherein each interconnected slider assembly, gripper positioning member, and articulating linkage assembly comprises an eccentric slider crank mechanism in which the axis of said joint of said articulating linkage assembly is offset from said pivot axis by said gripper positioning member, and the axis of said pivotal connection between said slider assembly and said articulating linkage assembly is vertically offset from said pivot axis of said gripper positioning member.

8. The apparatus of claim 7 wherein, in each eccentric slider crank mechanism, said pivot axis of said gripper positioning member is laterally between said axis of said pivotal connection and said axis of said joint and wherein said joint is laterally between the lateral location of said pivotal connection and the lateral location of said fixed connection.

* * * * *

UNITED STATES PATENT OFFICE
CERTIFICATE OF CORRECTION

PATENT NO. : 3,861,732
DATED : January 21, 1975
INVENTOR(S) : John Charles Piper It is certified that error appears in the above-identified patent and that said Letters Patent are hereby corrected as shown below:

Column 1, line 46, "page" should be --pair--

Column 2, line 66, "griping" should be --gripping--

Column 4, lines 37 & 38, delete "bars 52 is substantially equivalent to the spacing between the two"

Column 8, line 1 of Claim 2, delete "in"

Column 9, line 13 of Claim 4, after "of" insert --one of--

Signed and Sealed this eleventh Day of May 1976

[SEAL]

Attest:

RUTH C. MASON
*Attesting Officer*

C. MARSHALL DANN
*Commissioner of Patents and Trademarks*